(No Model.) 2 Sheets—Sheet 1.
G. WESTINGHOUSE, Jr.
PROPORTIONAL METER.
No. 347,673. Patented Aug. 17, 1886.
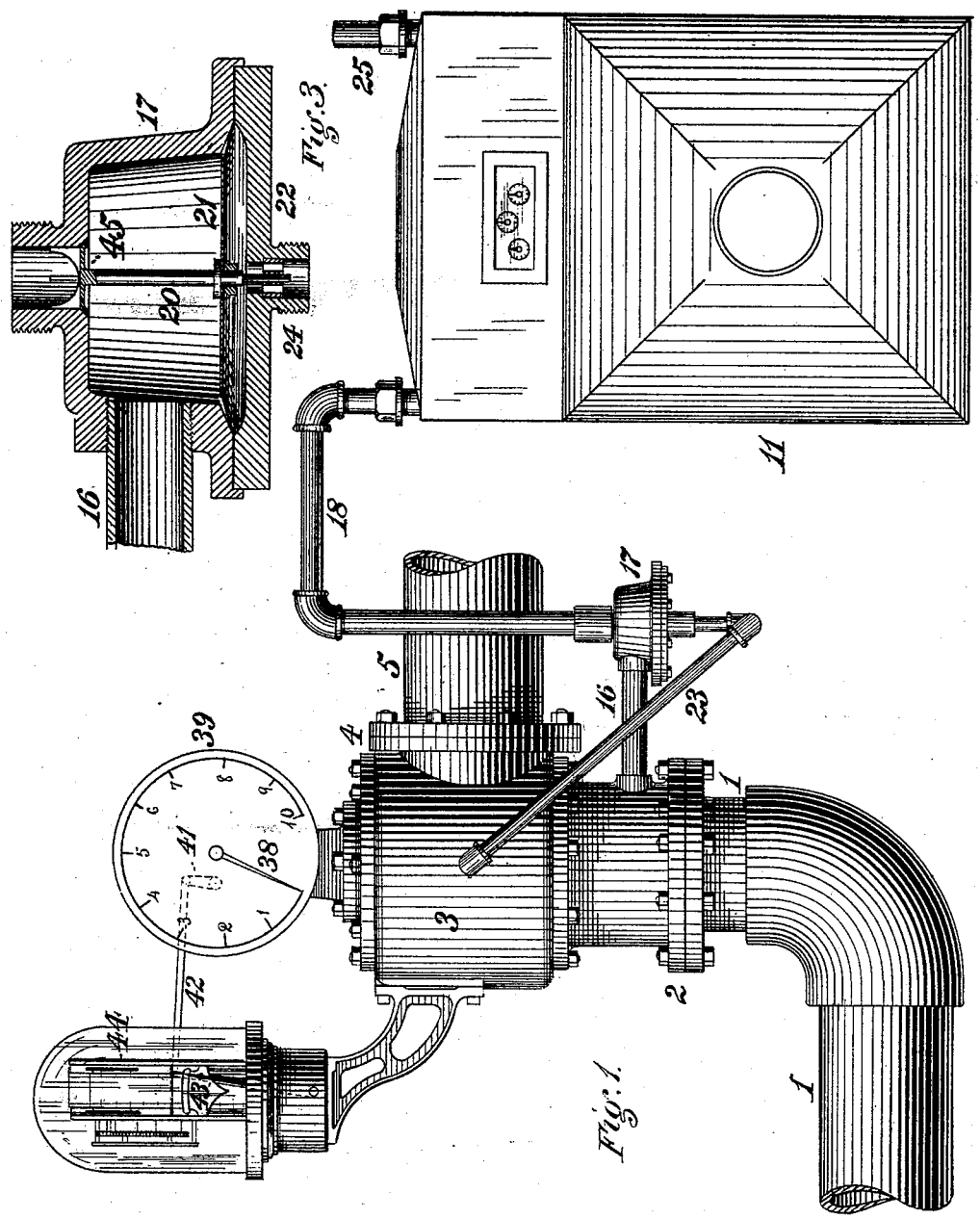

(No Model.)  2 Sheets—Sheet 2.
G. WESTINGHOUSE, Jr.
PROPORTIONAL METER.
No. 347,673.  Patented Aug. 17, 1886.
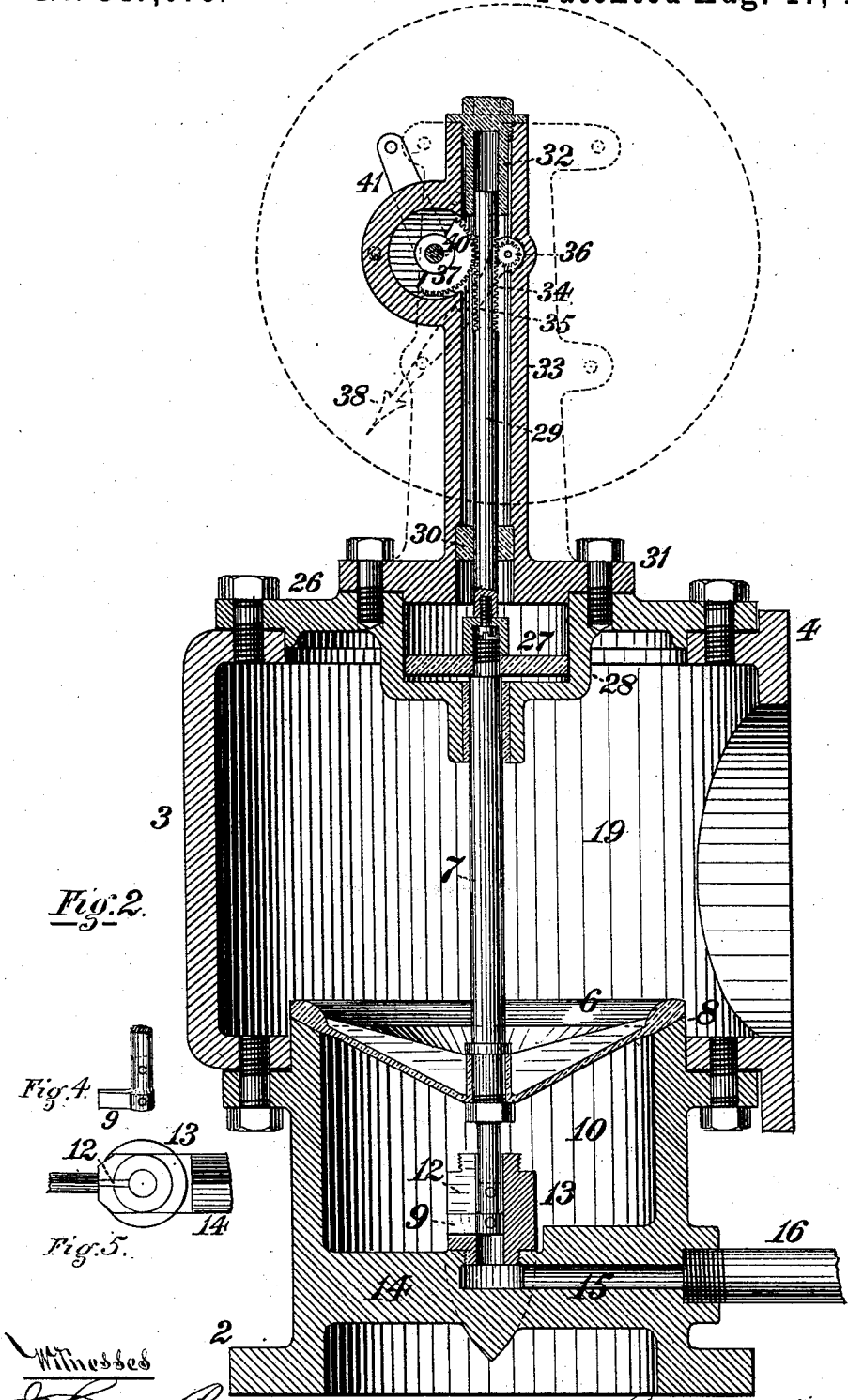

UNITED STATES PATENT OFFICE.

GEORGE WESTINGHOUSE, JR., OF PITTSBURG, PENNSYLVANIA.

PROPORTIONAL METER.

SPECIFICATION forming part of Letters Patent No. 347,673, dated August 17, 1886.

Application filed April 3, 1886. Serial No. 197,608. (No model.)

*To all whom it may concern:*

Be it known that I, GEORGE WESTINGHOUSE, Jr., residing at Pittsburg, in the county of Allegheny and State of Pennsylvania, a citizen of the United States, have invented or discovered a certain new and useful Improvement in Apparatus for Measuring and Indicating the Volume and Rate of Flow of Fluids, of which improvement the following is a specification.

In the accompanying drawings, which make part of this specification, Figure 1 is a side view in elevation of a measuring and indicating apparatus embodying my invention; Fig. 2, a vertical central section, on an enlarged scale, through the valve-chest of the same; Fig. 3, a similar section through the pressure-regulator; Fig. 4, a view in perspective of the meter-supply valve, and Fig. 5 a plan or top view of the meter-supply-valve seat.

The object of my invention is to provide effective and desirable means for the ascertainment, indication, and registration of the volume of fluid passing through a conduit or main, as well as of the rate of flow of the fluid therein, in accordance with the governing conditions of supply.

To this end my invention, generally stated, consists in the combination of two coincidently-operating valves governing the proportionate delivery of fluid from a supply-pipe to a meter, the capacity of which is a determined fraction of the total volume, and to a direct-delivery outlet, a pressure-regulator acting to maintain a uniform degree of pressure in the meter and direct-delivery passages, and mechanism for indicating visually and for recording the rate of flow of the fluid.

The improvement claimed is hereinafter fully set forth.

In the practice of my invention I connect the supply-pipe 1, through which the fluid to be measured is conveyed from a well, generator, reservoir, or other source of supply, to a flange or nozzle, 2, formed upon or secured to a valve chest or casing, 3, which is likewise provided with a flange or nozzle, 4, to which is connected a direct-delivery pipe, 5, leading to a furnace or other desired point of delivery of fluid. The passage of fluid from the supply-pipe to the direct-delivery pipe is controlled by a direct-delivery supply-valve, 6, fixed upon a stem, 7, and adapted to close against a suitable seat or valve-face, 8, in the chest 3, the degree of opening and closure of said valve corresponding, as presently to be described, with that of a meter-supply valve, 9, governing the admission of fluid from a chamber, 10, in the valve-chest on the supply side of the valve 6, to a meter, 11, of any suitable and preferred construction, the capacity of which is preferably a small determined fraction of the entire volume of supply, in order that a small and inexpensive meter may serve for the measurement of comparatively-large quantities of fluid.

It will be obvious that in order to insure accurate measurement and registration by the meter its supply of fluid must constantly bear the same ratio to the volume supplied to the direct-delivery pipe, so that it shall, under all conditions of volume and pressure, receive such fraction of the entire volume of supply as may accord with its predetermined capacity required therefor, and, further, that the difference of pressure between the valve-chest supply chamber and the direct-delivery pipe must correspond substantially with the difference of pressure between the supply-chamber and meter-chamber. These objects are attained by the valve mechanism and regulating device now to be described.

The meter-supply valve 9, which is fixed upon the lower end of the stem 7 of the direct-delivery valve 6, and moves coincidently with said valve, works in and governs the degree of opening of a vertical slot, 12, formed in a valve-chamber, 13, secured centrally in a transverse support, 14, in the supply-chamber 10 of the valve-chest 3, said slot, when opened by the elevation of the valve-stem 7 and meter-supply valve 9, establishing communication between the chamber 10 and a passage, 15, leading from the valve-chamber 13 to a pipe, 16, which communicates through a pressure-regulator chamber, 17, with a supply-pipe, 18, leading into the meter 11. The area in transverse section of the slot 12 is made such that its ratio to the area of the face 8 of the direct delivery supply-valve 6—as, say, one three-hundredth, (more or less)—shall be equal to the ratio of the determined capacity of the meter 11 to the volume of fluid passing to the direct delivery, so that under all degrees of opening of the direct delivery and meter-supply valves the proportionate delivery to the meter is constantly equal to the predetermined fraction of supply-volume with which the capacity of the meter accords. Such proportionate delivery being maintained, the readings of the meter multiplied by the denominator of such fraction will indicate the entire volume of fluid which is passed through the apparatus in any given period.

To maintain the required proportionate flow of fluid to the direct-delivery pipe 5 and to the meter 11, respectively, it is necessary that there shall be the same or approximately the same difference of pressure between the supply-chamber 10 and the passage 15, leading to the meter, as that (determined by the weight of the delivery supply-valve 6 and its connections) which exists between the supply-chamber 10 and the delivery-chamber 19. Such substantial equation of differences of pressure is effected and maintained by a pressure-regulating device interposed between the valve-chest 3 and the meter, the same being illustrated more fully in the enlarged sectional view, Fig. 3. The pipe 16, which receives the proportionate volume of fluid which is to be passed through and measured by the meter, leads into a pressure-regulator chamber, 17, from which a pipe, 18, governed by a valve, 45, which is adapted to close in the direction of the flow of fluid, leads to the supply side of the meter 11. The valve 45 is fixed upon a stem, 20, connected to the center of a movable pressure-plate, which is preferably in the form of a flexible diaphragm, 21, which is clamped at and adjacent to its periphery between a flange on the bottom of the regulator-chamber 17 and a plate, 22, which closes the lower end of said chamber. A pipe, 23, leading from the delivery-chamber 19 of the valve-chest 3 and connected to a nozzle, 24, on the plate 22, establishes communication between said chamber and the space below the diaphragm 21.

From the above construction it will be seen that the pressure of the fluid, acting from the delivery-chamber 19, through the pipe 23, on the lower side of the diaphragm 21, tends to close the regulator-valve 45, and that fluid cannot pass to the meter except as said valve is opened, which is effected by the pressure of fluid supplied to the regulator-chamber from the valve-chest supply-chamber 10, through the passage 15 and pipe 16, as the same are opened by the meter-supply valve 9, such pressure acting upon the upper side of the diaphragm 21, and consequently tending to open the valve 45. Under any variation of pressure in the delivery-chamber 19 a corresponding variation of pressure in the passage 15 will suffice to keep open the valve 45, the degree of opening of which will be proportioned to such variations. The fluid passing out of the meter through its delivery-pipe 25 is discharged at the point of consumption at atmospheric pressure, after having been measured at such pressure, irrespective of variations that may take place in the supply and delivery chambers 10 and 19.

The stem 7 of the direct-delivery and meter-supply valves passes freely, but with sufficient tightness to prevent leakage of fluid, through the cap or head 26 of the valve-chest 3, and to obviate chattering or unduly-rapid movements of the valves a piston, 27, is secured upon the valve-stem 7, said piston fitting in a closed cylinder, 28, which is cast integral with or secured to the head 26, and serves as a dash-pot or cushion-chamber to regulate the movement of the valve-stem and valves under sudden and frequent variations of pressure, and prevent the jar and noise which the same tend to induce.

For the purpose of indicating and recording the rate of flow—that is, the number of cubic feet of fluid passing through the apparatus in a given period—the valve-stem 7 is prolonged by the addition of a supplemental section, 29, which is secured to the stem 7, above the dash-pot piston 27, and works freely through a plug or partition, 30, which closes the central portion of the head 31 of the dash-pot 28, and in a guide or socket, 32, at the upper end of a chamber or tubular extension, 33, of the head 31. Racks 34 and 35 are cut upon opposite sides of the supplemental valve-stem section 29, adjacent to its upper end, one of which racks, 34, engages a pinion, 36, fixed on a shaft carrying an index, 38, adapted to traverse over the face of a suitably-marked dial-plate, 39, and by its position thereon to indicate the rate of flow. The opposite rack, 35, engages a segmental gear, 37, secured to a shaft, 40, which carries an arm, 41, the outer end of which is connected by a link, 42, with the pencil-arm 43 of a clock-work-recording mechanism, 44, of any suitable construction, adapted to form a diagram or continuous record on a band of paper.

The reading of the meter 11 multiplied by its ratio of proportionate capacity indicates the quantity of fluid which has passed through the apparatus, and the diagram formed by the recording mechanism indicates the exact quantity of fluid consumed at any particular time—a matter of material importance as regards economy in its use.

I claim herein as my invention—

1. The combination of a valve chest or chamber having a fluid-supply and a direct-delivery opening, a pair of coincidently-operating valves of unequal areas, respectively, working in said chest and governing the passage of fluid to the direct-delivery opening and to a meter-supply passage leading to a meter, and a pressure-regulating mechanism interposed between the meter-supply passage and meter and governing the supply of fluid to the meter, substantially as set forth.

2. The combination of a main chest or chamber having a fluid-supply and a direct-delivery opening, a pair of coincidently-operating valves of unequal areas, respectively, working in said chest and governing the passage of fluid to the direct-delivery passage and to a meter-supply passage, a meter, a pressure-regulator chamber communicating by a pipe with the supply-opening of said meter, a movable pressure-plate extending across said chamber and connected to a valve governing the pipe leading therefrom to the meter, a pipe connecting said chamber between the abutment and valve with the meter-supply passage of the main valve-chest, and a pipe connecting the delivery-chamber of the main valve-chest with the regulator-chamber on the opposite side of the pressure-plate from the meter-supply-passage pipe, substantially as set forth.

3. The combination of a valve chest or chamber having a fluid-supply and a direct-delivery opening, a direct-delivery valve and a meter-supply valve of unequal areas, respectively, fixed upon a stem moving in said chest and governing the passage of fluid to the direct-delivery opening and to a meter-supply passage, and a piston fixed upon the valve-stem and working in a dash-pot or cushion-chamber connected to the valve-chest, substantially as set forth.

4. The combination of a fluid-supply pipe, valves governing the passage of fluid therefrom to a direct-delivery pipe and to a meter-supply pipe, a meter, and a valve controlling communication between the meter-supply pipe and meter, and coupled to a movable pressure-plate which receives pressure in direction to open the valve from the delivery side of the valve governing the meter-supply pipe, and in direction to close the valve from the delivery side of the valve governing the direct delivery, substantially as set forth.

5. The combination of a valve chest or chamber having a fluid-supply and a direct-delivery opening, a direct-delivery valve and a meter-supply valve of unequal areas, respectively, fixed upon a stem moving in said chest and governing the passage of fluid to the direct-delivery opening and to a meter-supply passage, a rack formed on or fixed to the valve-stem, and a pinion engaging said rack and fixed upon a shaft carrying an index-arm, substantially as set forth.

6. The combination of a valve chest or chamber having a fluid-supply and a direct-delivery opening, a direct-delivery valve and a meter-supply valve of unequal areas, respectively, fixed upon a stem moving in said chest and governing the passage of fluid to the direct-delivery opening and to a meter-supply passage, a rack formed on or fixed to the valve-stem, a segmental gear engaging said rack, an arm fixed upon the shaft of said gear, and a clock-work-recording mechanism having its pencil coupled to the arm of the segmental-gear shaft, substantially as set forth.

7. The combination of a fluid-supply pipe, valves fixed upon a common stem and governing the passage of fluid from the supply-pipe to a direct-delivery pipe and to a meter-supply pipe, a visual indicator actuated by the stem of the supply-pipe, and a clock-work-recording mechanism having its pencil-arm actuated by said stem, substantially as set forth.

In testimony whereof I have hereunto set my hand.

GEO. WESTINGHOUSE, JR.

Witnesses:
R. H. WHITTLESEY,
J. SNOWDEN BELL.